(12) United States Patent
Rieker et al.

(10) Patent No.: US 8,604,659 B2
(45) Date of Patent: Dec. 10, 2013

(54) STATOR WITH INSULATION FOR AN ELECTRIC MOTOR, INSULATION FOR A STATOR, AND ELECTRIC POWER TOOL

(75) Inventors: Werner Rieker, Waldenbuch (DE); Gerhard Oberli, Niederbipp (CH)

(73) Assignee: Robert Bosch GmbH, Stuttgart (DE)

( * ) Notice: Subject to any disclaimer, the term of this patent is extended or adjusted under 35 U.S.C. 154(b) by 853 days.

(21) Appl. No.: 12/666,213

(22) PCT Filed: May 5, 2008

(86) PCT No.: PCT/EP2008/055461
§ 371 (c)(1),
(2), (4) Date: Dec. 22, 2009

(87) PCT Pub. No.: WO2009/000585
PCT Pub. Date: Dec. 31, 2008

(65) Prior Publication Data
US 2010/0170690 A1  Jul. 8, 2010

(30) Foreign Application Priority Data
Jun. 27, 2007 (DE) .......................... 10 2007 029 739

(51) Int. Cl.
*H02K 3/00* (2006.01)
*H02K 1/06* (2006.01)

(52) U.S. Cl.
USPC ................... 310/194; 310/179; 310/215.002; 310/216.003

(58) Field of Classification Search
USPC .............. 310/64, 71, 179, 194, 208, 216.014, 310/216.002, 216.003; 29/596
See application file for complete search history.

(56) References Cited

U.S. PATENT DOCUMENTS

| | | | | |
|---|---|---|---|---|
| 2,956,252 | A * | 10/1960 | Boode et al. | 338/42 |
| 3,508,092 | A * | 4/1970 | Hallidy | 310/64 |
| 3,781,578 | A * | 12/1973 | Smith et al. | 310/52 |
| 3,805,104 | A * | 4/1974 | Margrain et al. | 310/266 |
| 3,911,299 | A * | 10/1975 | Kristen et al. | 310/64 |
| 4,837,921 | A | 6/1989 | Tassinario | |
| 5,313,131 | A * | 5/1994 | Hibino et al. | 310/216.002 |
| 2003/0038555 | A1* | 2/2003 | Ozawa et al. | 310/154.02 |
| 2003/0222516 | A1* | 12/2003 | Cleanthous et al. | 310/50 |
| 2003/0230950 | A1* | 12/2003 | Reimann | 310/192 |
| 2007/0117911 | A1* | 5/2007 | Irwin et al. | 524/495 |

FOREIGN PATENT DOCUMENTS

| | | |
|---|---|---|
| EP | 0313514 A1 | 4/1989 |
| JP | 50080407 A | 6/1975 |
| JP | 52125703 A * | 10/1977 |
| WO | 03079520 A1 | 9/2003 |

* cited by examiner

*Primary Examiner* — Tran Nguyen
*Assistant Examiner* — Jose Gonzalez Quinones
(74) *Attorney, Agent, or Firm* — Kenyon & Kenyon LLP

(57) ABSTRACT

The invention is based on a stator having an insulation which is arranged around a coil winding package, wherein a stator packet is arranged on the insulation. It is proposed that the insulation means be embodied as a self-supporting sleeve.

26 Claims, 3 Drawing Sheets

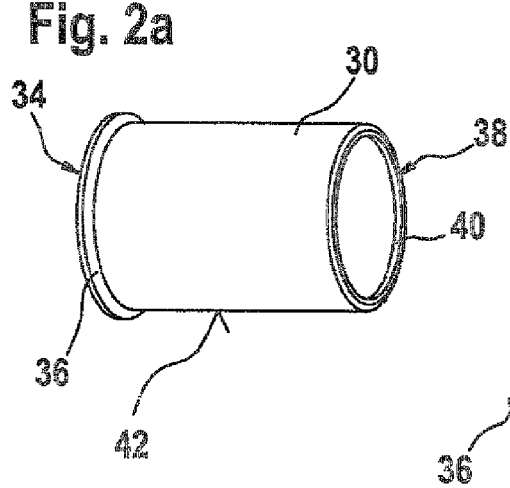
Fig. 2a
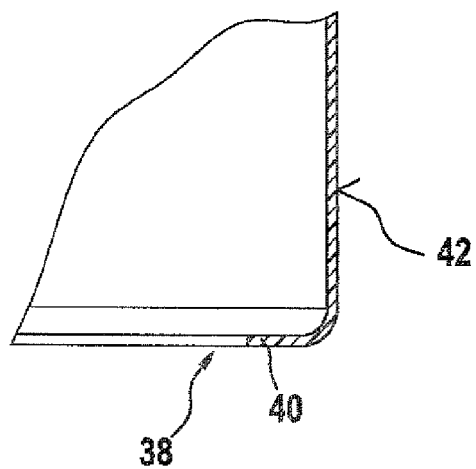
Fig. 2b
Fig. 2c

STATOR WITH INSULATION FOR AN ELECTRIC MOTOR, INSULATION FOR A STATOR, AND ELECTRIC POWER TOOL

CROSS-REFERENCE TO RELATED APPLICATION

This application is a 35 USC 371 application of PCT/EP2008/055461 filed on May 5, 2008.

BACKGROUND OF THE INVENTION

1. Field of the Invention

The invention is based on a stator with an insulation, on an insulation for a stator, and on an electric power tool.

2. Description of the Prior Art

Brushless direct current motors (BLDC motors) with air gap winding are typically equipped with a winding package on which a stator packet is mounted. Such BLDC motors are used in electric power tools, for instance. In self-supporting winding packages, the winding package is inserted into the respective stator packet that is formed of individual sheet-metal rings. Between the winding package and the stator packet, a surface insulation is necessary, in order to avoid a short circuit between the typically enamel-insulated winding wires and the stator packet. This surface insulation, which is usually a few hundred micrometers thick, has a rectangular shape and is placed in the manner of a jacket around the winding package. The edges of the surface insulation gape apart, so that in the longitudinal direction of the winding package, an unprotected region can occur opposite the stator packet. This can lead to problems on the one hand if demands made with regard to air gaps and leakage distances are not met, and on the other hand it makes inserting the winding package into the stator packet more difficult, since the winding package must be seated with as precise a fit as possible in the stator packet in order to enable good heat dissipation out of the winding package. The surface insulation may be slightly damaged in the process.

ADVANTAGES AND SUMMARY OF THE INVENTION

The invention is based on a stator with an insulation disposed around the winding package, with a stator packet disposed on the insulation.

It is proposed that the insulation is embodied as a self-supporting bush. It is advantageous that the insulation can be produced with a precise fit, and it is possible to avoid the development of centers of impact, which can threaten an electrical insulation between the stator packet and coil wires of the winding package, or which hinders the insertion of the winding package into the stator packet. Requirements in terms of air gaps and leakage distances can be ensured even for corded electric motors and electric power tools. A high degree of insulation properties can be created between the winding package and the stator iron, even if the enameled copper wires of the winding package have a number of flaws resulting from production where the enamel insulation does not have the requisite thickness or is not even present at all. The bushlike insulation protects the winding package from becoming damaged while be installed in the stator packet.

Advantageously, the winding package can protrude axially and radially past the insulation on one of its axial ends, and on that end, the insulation can have a radially outward-shifted widened portion that traces an outer contour of the winding package. The widened portion, given a conventional impregnation of the insulation and/or of the stator with a mechanically stabilizing material such as an impregnating resin, an advantageous accumulation of the material can be attained that can collect at the widened portion. As a result, enameled copper wires of the winding package, which are especially heavily loaded by deformation in the region of this widened portion, can additionally be electrically insulated, even if their original enamel insulation was damaged as a result of the deformation.

In the region of the widened portion, a fixation ring, which is located axially between the widened portion and the stator packet disposed around the winding package, can be disposed on the outer circumference. The widened portion assures an electrical insulation between the fixation ring and the winding package. Simultaneously, a defined spacing between the stator packet and the winding package can be ensured. When the electric motor is in operation and the stator is inserted, it is possible, by means of the widened portion and additionally by means of the fixation ring, to maintain a minimum spacing between the stator packet and the winding package, and thus to avert an electrical short circuit or mechanical damage, even if high axial acceleration—for instance in the percussion mode of a percussion hammer—should cause one or more sheet-metal laminations of the stator packet to become loose.

If the insulation can have a radially inward-pointing rib on one axial end, then the insulation protects the winding package efficiently against damage while it is being installed in the stator packet.

The production of the insulation is especially simple and replicable if the insulation is formed of at least one strip whose edges extend obliquely to a longitudinal axis of the bush. It is favorable that an air gap oriented in the longitudinal direction cannot develop in the insulation.

Increased mechanical strength can be attained if the insulation can be pierced by a mechanically stabilizing material, such as an impregnating resin.

In a further aspect of the invention, an insulation for a stator is proposed in the form of a self-supporting bush shape. It is provided that a winding package be inserted into the insulation.

Preferably, the bush shape can be formed by at least one strip of material wound obliquely to a longitudinal axis of the bush shape. Thus a plurality of strips can be glued diagonally in such a way that an endless bush is created. As a result of the bush shape of the insulation, the assembly of an electric motor during production can be facilitated. A very simple, economical material can be used, since because of the nature of the insulation, the risk of damage to the insulation is also reduced.

Advantageously, the strip of material can be formed of paper. The manner in which the insulation is manufactured allows a wide selection of materials. Electrical insulation papers are suited, up to and including baked-enamel-coated paper or extremely high-voltage cable paper in accordance with DIN Standard VDE 0311-35. This latter is a material that is especially simple and economical for surface insulation materials in the electrical engineering industry. One skilled in the art will make a suitable selection depending on general conditions.

On one axial end of the insulation, a radially outward-shifted widened portion can be disposed, and/or a radially inward-pointing rib can be provided on one axial end. If one end is provided with the radial widened portion and the opposite end is provided with the inward-pointing rib, an insulation is created which can protect the winding package against damage during installation and in operation especially efficiently.

The insulation can have a slight wall thickness of less than 100 μm up to several hundred micrometers and can be adapted in its dimensions precisely to the outside diameter of the winding package and to the size of the gap between the winding package and the stator packet.

An electric motor with a stator is proposed, between whose winding package and stator packet has an insulation embodied as a self-supporting bush. Because of the nature of the insulation, the penetration of the insulation with a mechanically stabilizing material, such as an impregnating resin, can be facilitated. On the one hand, production can advantageously be improved, since the impregnation time can be shortened. On the other, an intimate connection is possible between the winding package and the stator packet. The mechanical load-bearing capacity of the electric motor for vibration in operation is increased substantially, and the temperature transition from the winding package to the stator packet is improved; that is, the heat transfer is markedly reduced.

Under normal mechanical stresses and with the use of baked-enamel-coated paper, it is even possible to dispense with impregnating resin entirely.

The winding of the electric motor is embodied as a winding package comprising six coils, for instance, with two coils per phase and three phases. Depending on the desired rpm of the electric motor and on the supply voltage, the winding comprises only a few turns. To attain a high fill factor and to be able to embody the winding for the sake of the least possible radii, parallel winding is done; that is, the winding is done with a plurality of wires simultaneously. For the sake of being able to automate production, the winding can be embodied from a technical standpoint preferably in the form of a continued series circuit.

By means of the parallel winding, only a few different wire diameters suffice in manufacture, corresponding for instance to the number of variants of a particular motor size. The winding wires can be embodied as baked-enamel wires. The coils of the winding package are wound onto a coil body which is removed after the winding. To economize on structural length, an end winding is formed which faints a radially outward-shifted edge, and on the opposite side, the edge is shifted radially inward, so that a bottom forms that is open at the center. Next, the winding, or the winding package is baked to make a solid body. A surface insulation is applied over the winding package, preferably being a self-supporting bush of a surface insulation material. The insulated winding package is introduced into the stator iron, which comprises sheet-metal rings stacked axially on one another. The fixed seat in the stator can be attained by embodying the surface insulation as baked-enamel paper or by means of additional impregnation with impregnating resin. The advantages of the impregnation are on the one hand mechanically securing the winding against twisting from the motor torque occurring in operation, and on the other, improved heat dissipation from the winding, which leads not only to an increase in the rated output but also to improved overload capacity and thus to extreme robustness of the motor.

The rotor comprises the rotor shaft and a permanent magnet secured to the rotor shaft; the magnet can be embodied as a solid magnet or can comprise axially lined-up rings and is usually formed of a rare earth magnet material, such as Nd—Fe—B alloys. The rotor shaft is equipped with ball bearings, but slide bearings are also conceivable.

The BLDC motor with air gap winding has a number of advantages over a BLDC motor with a slotted stator and a DC motor. High rotary speeds of up to 50,000 rpm and more can be attained, up to the load limit of a gear coupled with the motor. At high rotary speeds, only slight iron losses occur. Because of its type of construction, the motor attains low inductance, while higher inductances lead to lower effective currents with rising rotary speeds, and increasing inductance causes increased switching losses in the electronics. As a result of the only slight iron and copper losses, the BLDC motor with air gap winding attains a high maximum efficiency. Because of the low-impedance winding, optimal efficiency is attained over virtually the entire operating range. The type of winding allows a high "slot space factor" and as a result leads to a high power density and allows comparatively fine adaptation to the desired rpm. Because of the type of production of the winding, the motor is especially well suited to a wide range of stator diameters, from approximately 20 mm to over 40 cm. Moreover, only a relatively low investment expense is required for partly automated production in relatively high numbers. It is also advantageous that because of progress rechargeable battery technology and hence lower internal resistances in rechargeable batteries, the advantages of the BLDC motor with air gap winding become disproportionately greater compared to the BLDC motor with a slotted stator.

An electric power tool, in particular an electric power tool having a tool insert can be driven in percussive and/or rotary fashion, having an electric motor which includes a stator having at least one of the characteristics described above is advantageous.

BRIEF DESCRIPTION OF THE DRAWINGS

The invention will be described in further detail below in two exemplary embodiments in conjunction with the associated drawings, in which:

FIG. 2*a* is an oblique view of a preferred insulation, in the form of a self-supporting bush;

FIG. 2*b* shows a longitudinal section through the preferred insulation;

FIG. 2*c* shows a detail of the insulation in the region IIC of FIG. 2*b;*

DESCRIPTION OF THE PREFERRED EMBODIMENT

Figure 1:
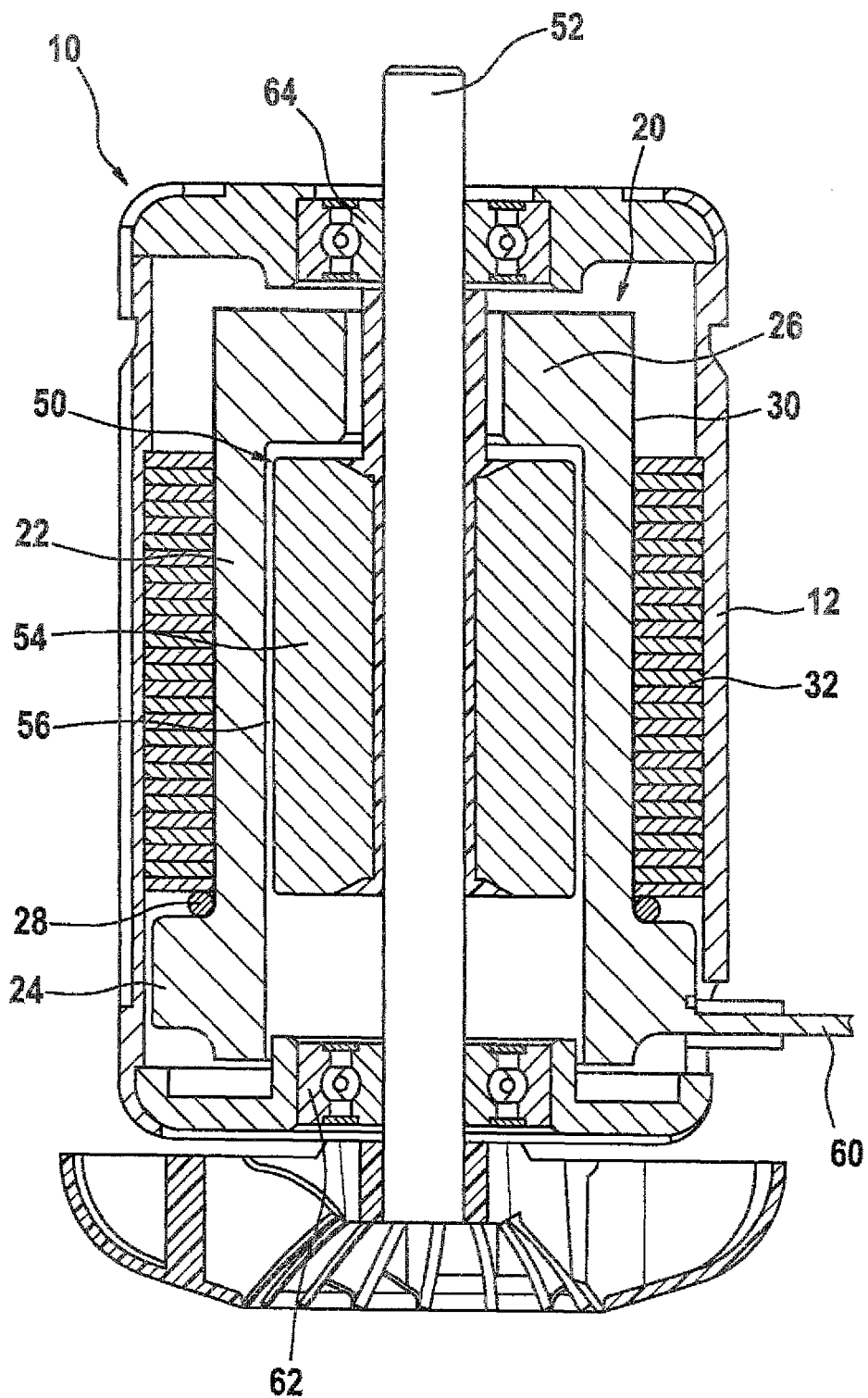
FIG. 1 shows a longitudinal section through a preferred electric motor.

In the drawings, elements that are identical or functional identically are identified by the same reference numerals.

FIG. 1 shows a longitudinal section through a preferred electric motor 10, having a stator 20 disposed in a housing 12 and having a rotor 50 disposed as an internal rotor. The rotor 50 has a rotor shaft 52, on which a permanent magnet 54 is disposed. The rotor shaft 52 is supported in one lower and one upper bearing 62, 64, respectively, preferably a roller bearing. A slide bearing would also be conceivable. Between an outer circumference of the rotor 50 and an inner contour of a winding package 22 of the stator 20 of the electric motor 10, an air gap 56 is embodied.

An insulation 30, on which a stator packet 32 is disposed, is mounted on the outer circumference of the winding package 22. The stator packet 32 in the usual way comprises successive sheet-metal rings in the axial direction. The winding package 22, in the usual way, comprises a winding which is shaped in a suitable way and comprises many enameled copper wires.

The winding package 22, on its lower end in the drawing, has an axial widened portion in the form of an end winding 24, which has an outer diameter that corresponds approximately to the outer diameter of the stator packet 32. With this end winding 24, the winding package 22 protrudes axially and radially past the insulation 30. On the opposite end 26, the winding package 22 is recessed radially inward, so that overall the result is an approximately cuplike shape with an edge shifted outward, corresponding to the end winding 24, and the cup shape is penetrated by the rotor shaft 52 having the permanent magnet 54. Via an electrical terminal 60 on the end winding 24, the winding package 22, or the coils of the winding package that are not shown in further detail, can be supplied with current.

A fixation ring 28 is disposed between the stator packet 32 and the end winding 24 of the winding package 22 in such a way that the fixation ring conforms to the radius between the main body and the end winding 24. In the process, the fixation ring 28 also comes to rest on the insulation 30.

The preferred insulation 30 is shown in more detail in FIGS. 2a-2c, which will be described here together. The insulation 30 is embodied, between a first end 34 and a second end 38, in the form of a self-supporting bush with a cylindrical jacket face 42.

On the first end 34, the insulation 30 has a radially outward-shifted widened portion 36, which traces the outer contour of the winding package 22 (end winding 24, FIG. 1). On the second end 38, the insulation 30 has an integral open bottom with a radially inward-pointing rib 40.

The rib 40 facilitates the assembly of the stator packet 22 (FIG. 1) considerably, which can now be thrust more easily over the insulation 30 that is closed at the jacket face 42. The widened portion 36 facilitates the insertion of the winding package 22 into the insulation and protects the winding at a point on the end winding 24 of the winding package 22 that is highly stressed from deformation of the enameled copper wires.

Preferably, the insulation 30 embodied as a bush is formed of a paper comprising two or more plies, and the plies are glued together diagonally in such a way that an endless bush is created. In FIG. 2b, a diagonally extending seam 44 in the jacket face 42 of the insulation 30 is indicated.

Figure 3:
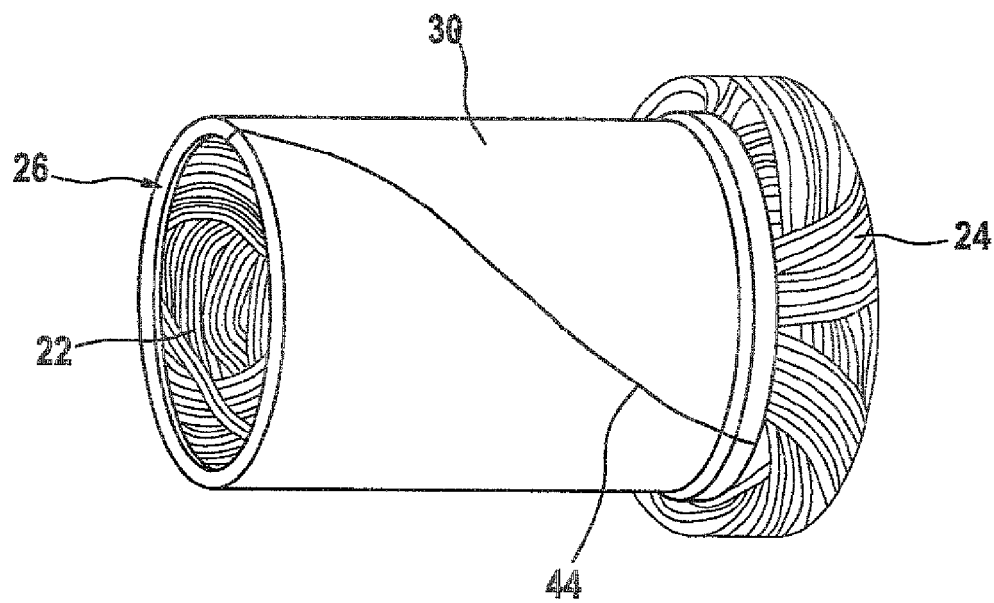
FIG. 3 is an oblique view of a preferred stator part, with an insulation thrust onto a winding package.

This manner of manufacturing the insulation 30 permits a wide selection of materials. Any kind of electrical insulation paper, up to and including baked-enamel-coated paper, is suitable. The insulation 30 embodied as a bush can then, expediently with the winding package 22 inserted, be thoroughly saturated with a resin, such as impregnating resin, for the sake of mechanical stabilization. In that case, the connection between the insulation 30 and the winding package 22 is especially intensive. At the widened portion 36 of the insulation 30, more resin can accumulate and provide additional protection for the stressed point at the end winding. This can easily be seen from FIG. 3, which shows a winding package 22, with an insulation 30, embodied as a bush, placed on it. The end winding 24 protrudes radially and axially past the insulation 30, while the inward-pointing integral rib 40 grips the bottom 26 of the winding package 22 peripherally and protects it.

The insulation 30 embodied as a bush may have a wall thickness of from one to several hundred micrometers and can be adapted in its dimensions precisely to the outer diameter of the winding package and to a gap size between the winding package 22 and the stator packet 32.

Figure 4:
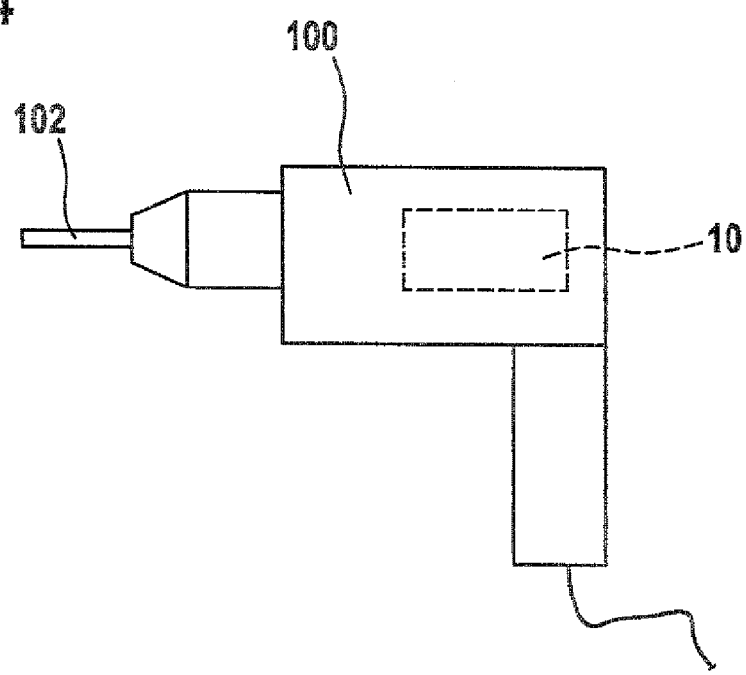
FIG. 4 shows a preferred electric power tool having an electric motor according to the invention.

FIG. 4, finally, shows a preferred electric power tool 100 for corded or cordless operation, in the form of an electric power tool 100 which has a tool insert 102 that can be driven in percussive and/or rotary fashion. The electric power tool has an electric motor 10, which is equipped with a stator 20, of the kind described above in conjunction with FIGS. 1 through 3. The electric power tool 100 can in particular be a heavy-duty electric power tool, such as an industrial screwdriver, a cordless screwdriver, or a power drill.

The foregoing relates to the preferred exemplary embodiment of the invention, it being understood that other variants and embodiments thereof are possible within the spirit and scope of the invention, the latter being defined by the appended claims.

The invention claimed is:

1. A stator comprising:
   an insulation embodied as a self-supporting bush having a stator-facing surface and a rotor-facing surface disposed around a winding package, and
   a stator packet disposed on the stator-facing surface of the insulation,
   wherein the rotor-facing surface of the insulation has a diameter equal to that of an outer winding surface of the winding package and the insulation has a thickness equal to a size of a gap between the winding package and the stator packet.

2. The stator as defined by claim 1, wherein the winding package protrudes axially and radially past the insulation on one of its axial ends, and on that end, the insulation has a radially outward-shifted widened portion that traces an outer contour of the winding package.

3. The stator as defined by claim 2 wherein in the region of the widened portion, a fixation ring is disposed on an outer circumference and is located axially between the widened portion and the stator packet disposed around the winding package.

4. The stator as defined by claim 1, wherein the insulation, on one axial end, has a radially inward-pointing rib.

5. The stator as defined by claim 2, wherein the insulation, on one axial end, has a radially inward-pointing rib.

6. The stator as defined by claim 3, wherein the insulation, on one axial end, has a radially inward-pointing rib.

7. The stator as defined by claim 1, wherein the insulation is formed of at least one strip, whose edges extend obliquely to a longitudinal axis of the bush.

8. The stator as defined by claim 2, wherein the insulation is formed of at least one strip, whose edges extend obliquely to a longitudinal axis of the bush.

9. The stator as defined by claim 3, wherein the insulation is formed of at least one strip, whose edges extend obliquely to a longitudinal axis of the bush.

10. The stator as defined by claim 4, wherein the insulation is fanned of at least one strip, whose edges extend obliquely to a longitudinal axis of the bush.

11. The stator as defined by claim 1, wherein the insulation is penetrated by a mechanically stabilizing material.

12. An insulation for a stator, the insulation embodied as a self-supporting bush shape having a stator-facing surface and a rotor-facing surface disposed around a winding package, wherein the rotor-facing surface of the insulation has a diameter equal to that of an outer winding surface of the winding package and the insulation has a thickness equal to a size of a gap between the winding package and the stator packet.

13. The insulation as defined by claim 12, wherein the bush shape is formed by at least one strip of material wound obliquely to a longitudinal axis of the bush shape.

14. The insulation as defined by claim 13, wherein the strip of material is formed of paper.

15. The insulation as defined by claim 12, wherein on one of its axial ends, has a radially outward-shifted widened portion, and/or a radially inward-pointing rib is provided on one axial end.

16. The insulation as defined by claim 13, wherein on one of its axial ends, has a radially outward-shifted widened portion, and/or a radially inward-pointing rib is provided on one axial end.

17. The insulation as defined by claim 14, wherein on one of its axial ends, has a radially outward-shifted widened portion, and/or a radially inward-pointing rib is provided on one axial end.

18. An electric motor, comprising:
a stator having an insulation embodied as a self-supporting bush having a stator-facing surface and a rotor-facing surface disposed around a winding package, and
a stator packet disposed on the stator-facing surface of the insulation,
wherein the rotor-facing surface of the insulation has a diameter equal to that of an outer winding surface of the winding package and the insulation has a thickness equal to a size of a gap between the winding package and the stator packet.

19. An electric power tool comprising:
a tool insert driven in percussive and/or rotary fashion;
an electric motor having a stator including:
an insulation embodied as a self-supporting bush having a stator-facing surface and a rotor-facing surface disposed around a winding package, and
a stator packet disposed on the stator-facing surface of the insulation,
wherein the rotor-facing surface of the insulation has a diameter equal to that of an outer winding surface of the winding package and the insulation has a thickness equal to a size of a gap between the winding package and the stator packet.

20. A stator comprising:
an insulation embodied as a self-supporting bush having a stator-facing surface and a rotor-facing surface disposed around a winding package, and
a stator packet disposed on the stator-facing surface of the insulation,
a fixation ring disposed on an outer circumference of the insulation that is situated axially between the stator packet and the insulation,
wherein the rotor-facing surface of the insulation has a diameter equal to that of an outer winding surface of the winding package and the insulation has a thickness equal to a size of a gap between the winding package and the stator packet.

21. The stator as defined by claim 20, wherein the winding package protrudes axially and radially past the insulation on one of its axial ends, and on that end, the insulation has a radially outward-shifted widened portion that traces an outer contour of the winding package.

22. The stator as defined by claim 21, wherein the fixation ring is disposed on the outer circumference in the region of the widened portion and is located axially between the widened portion and the stator packet disposed around the winding package.

23. The stator as defined by claim 20, wherein the insulation, on one axial end, has a radially inward-pointing rib.

24. The stator as defined by claim 21, wherein the insulation, on one axial end, has a radially inward-pointing rib.

25. The stator as defined by claim 22, wherein the insulation, on one axial end, has a radially inward-pointing rib.

26. The stator as defined by claim 20, wherein the insulation is formed of at least one strip, whose edges extend obliquely to a longitudinal axis of the bush.

* * * * *

UNITED STATES PATENT AND TRADEMARK OFFICE
CERTIFICATE OF CORRECTION

PATENT NO.       : 8,604,659 B2                                          Page 1 of 1
APPLICATION NO.  : 12/666213
DATED            : December 10, 2013
INVENTOR(S)      : Rieker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Twenty-second Day of September, 2015

Michelle K. Lee
*Director of the United States Patent and Trademark Office*